United States Patent [19]
Valentin et al.

[11] Patent Number: 4,879,450
[45] Date of Patent: Nov. 7, 1989

[54] LASER WELDING TECHNIQUE

[75] Inventors: Jean-Pascal Valentin, Povilley; Pierre Maitre, Besancon, both of France; Masahiro Kazahaya, Southampton, Pa.

[73] Assignee: Fischer & Porter Company, Warminster, Pa.

[21] Appl. No.: 279,175

[22] Filed: Dec. 2, 1988

[30] Foreign Application Priority Data

Dec. 2, 1987 [FR] France .................. 87 17102

[51] Int. Cl.⁴ .............................. B23K 26/00
[52] U.S. Cl. ..................... 219/121.64; 219/121.66; 219/121.86
[58] Field of Search ............ 219/121.63, 121.64, 219/121.82, 121.6, 121.85; 338/3-5

[56] References Cited

U.S. PATENT DOCUMENTS

| | | | |
|---|---|---|---|
| 3,889,272 | 6/1975 | Lou et al. | 219/121.8 X |
| 3,970,982 | 7/1976 | Kurtz et al. | 338/4 |
| 4,034,181 | 7/1977 | Packard | 219/121.63 X |
| 4,400,870 | 8/1983 | Islam | 219/121.64 X |
| 4,414,460 | 11/1983 | Sudo et al. | 219/121.64 |

FOREIGN PATENT DOCUMENTS 0047083  3/1984  Japan .............................. 219/121.64

OTHER PUBLICATIONS

Conference Digest, "Evaluating Pulsed-Laser Welding" *Machine Design* pp. 128 and 126.

*Primary Examiner*—C. L. Albritton
*Attorney, Agent, or Firm*—Michael Ebert

[57] ABSTRACT

A laser welding technique for joining two parts together, the parts having contacting faces which define an interfacial region. One part is permeable to a laser beam directed toward and focused on the interfacial region, the face of the other part having light-disruptive characteristics whereby when the beam impinges thereon, multiple internal reflections are produced within the interfacial region which trap the energy of the beam to generate sufficient heat to cause the parts to superficially melt and fuse.

9 Claims, 1 Drawing Sheet

LASER WELDING TECHNIQUE

BACKGROUND OF THE INVENTION

1. Field of Invention

This invention relates generally to laser welding techniques for joining two parts together and more particularly to a technique in which the contacting faces of the parts define an interfacial region, one of the parts being transparent to the laser beam which is directed toward and focused on the region, the face of the other part having light disruptive characteristics producing multiple internal reflections in the region which trap the energy of the beam to generate sufficient heat to cause the parts to superficially melt and fuse.

2. Status of Prior Art:

In a welding process, two parts or pieces are joined together by applying heat to their adjacent surfaces to melt and fuse them. The heat for this purpose may be derived from various sources such as an arc, a gas flame, or from a laser beam, the latter being the concern of the present invention.

In carrying out welding, it is often the practice to interpose a filler or brazing material between the surfaces of the parts being joined. The filler has a lower melting point than that of the parts so that when heat is applied, the filler is melted to solder the parts together. This category of welding is commonly known as braze welding.

Laser beam welding is a well known technique, for a high power laser beam is capable of generating sufficient heat to melt metals and other materials having a high fusion temperature. Lasers in current use are mainly of the Nd:YAG, $CO_2$, and Argon type. In practice, the laser beam may be pulsed or continuous.

Laser light is usually more intense, more monochromatic and more highly collimated than light from ordinary sources such as tungsten-filament lamps. The intensity of laser light can be extremely high. Thus power densities of over 1000 $MW/cm^2$ are obtainable to produce a beam capable of cutting through and vaporizing solid materials. Lasers fall into four basic categories: solid state-optically pumped; liquid dye; semiconductor; and gas. Together, these four laser types cover the spectral region extending from ultraviolet to infrared.

The present invention is of particular value in connection with the manufacture of pressure transducers, such as the differential-pressure transducer disclosed in the Kazahaya patent 4,754,365. In a transducer of this type, a diaphragm made of glass or other transparent material is joined at its periphery to the flat face of a ceramic body having a nest indented therein to receive the diaphragm when it deflects in response to pressure.

One known technique to seal the periphery of the glass diaphragm to the body of the transducer is by means of a glass or ceramic frit. But with this technique, it is difficult to control the thickness of the resultant seal with high accuracy, so that the diaphragm is properly positioned.

The prior patent to Barnes et al., U.S. Pat. No. 4,424,435, discloses a laser braze welding technique in which a part to be welded to another component is transparent to radiation at the wavelength of the laser beam. A layer of brazing material is placed in the interface between the two parts, and the beam is directed through the transparent part toward this layer to cause it to melt and thereby solder the parts The van Bennekom et al. U.S. Pat. No. 4,705,933 uses a laser braze welding technique for joining a transparent diamond component to metal. A layer of brazing material is heated by the laser beam which is focused through the diamond. The brazing material is a titanium-copper-silver eutectic having a brazing temperature of about 930° C.

Because the laser braze welding techniques disclosed in the above identified patents make use of a filler, they suffer from the same problems which are encountered when using a glass or ceramic frit, for the melted filler which is interposed between the contacting surfaces of the parts usually is not of uniform thickness.

Also known for carrying out laser beam welding is a technique which uses no brazing filler for this purpose. Thus the Osborne U.S. Pat. No. 4,069,080 focuses a laser beam onto the contact region between two transparent thermoplastic sheets to weld them together. Since such materials have low melting points, the required laser beam energy is of relatively low power.

Also employing a braze-free laser beam welding technique is the U.S. Pat. 4,636,609 to Nakomoto in which two resin parts are welded together, one being transparent and the other having light absorbing properties. By directing the laser beam through the first part onto the light absorbing part, the heat developed at the interface is sufficient to melt and fuse the parts together.

The practical drawback to braze-free laser beam welding is that when the parts to be joined are not thermoplastic resins but are made of materials having high fusion temperatures, the amount of heat generated at the interface of the parts is insufficient to effect fusion even with high powered lasers. Thus if the two parts to be welded together are both more or less permeable to radiation produced by the laser, very little heat will be generated at the interface. And while the presence of an energy absorbing brazing filler at the interface would effect welding, the seal produced by this filler would not be of controlled thickness, and in many applications this would not be acceptable.

While the present invention will be described hereinafter mainly in connection with welding a diaphragm to the body of a pressure transducer, it is to be understood that this is by way of example only; for the laser welding technique has many other practical applications.

SUMMARY OF INVENTION

The main object of this invention is to provide a laser beam welding technique for joining together two parts without the use of brazing material, the parts having high fusion temperatures.

More particularly, an object of this invention is to provide a laser beam welding technique for joining together two parts, at least one of which is formed of a material that is effectively transparent to the laser beam whereby the beam may be directed to an interfacial region between the faces of the parts to be joined.

Also an object of the invention is to provide a laser welding technique which is carried out in an evacuated chamber to avoid the possibility that gas in the interfacial region will expand and act to separate the parts.

Briefly stated, these objects are attained in a laser welding technique for joining two parts together, the parts having contacting faces which define an interfacial region. One part is permeable to a laser beam directed toward and focused on the interfacial region, the face of the other part having light-disruptive characteristics whereby when the beam impinges thereon, multiple internal reflections are produced within the interfacial region which trap the energy of the beam to generate sufficient heat to cause the parts to superficially melt and fuse.

BRIEF DESCRIPTION OF DRAWINGS

For a better understanding of the invention as well as other objects and further features thereof, reference is made to the following detailed description to be read in conjunction with the accompanying drawings, wherein.

DESCRIPTION OF INVENTION

The Basic Technique

Figure 1:
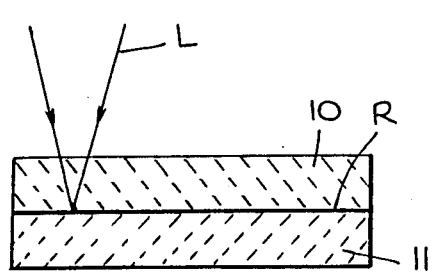
FIG. 1 shows two parts being welded together by a laser beam in a technique in accordance with the invention.
Figure 2:
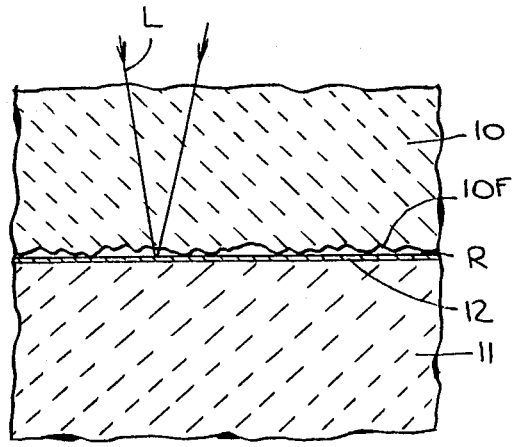
FIG. 2 is a schematic showing in highly magnified form the interfacial region between the two parts to be welded together.

Referring now to FIGS. 1 and 2, two parts 10 and 11 are shown having complementary planar faces in contact with each other in condition to be welded by a laser beam L which passes through part 10 and is focused at the interfacial region R between these parts.

Part 10 is formed of a material such as glass or fused quartz that is permeable to light radiation whose wavelength lies in a range of between 0.1 and 1.5 $\mu$m, or whatever other light wavelength is produced by a high power laser beam generator. It is to be noted that the beam generated by solid state lasers lies in the above-identified range.

Part 11 may be made of the same material as that of part 10, or it can be fabricated of another material, such as ceramic, which is not transparent to the laser beam. The contacting face of part 11 is so treated as to impart light-disruptive characteristics thereto. This may be effected by plating the face of part 11 with an extremely thin metallic reflective layer, as by evaporation, vacuum deposition, sputtering or any other known metal plating process.

The metallic coating on part 11, which is practice may be of aluminum or silver, need not be mirror-like, for a half mirror is sufficient to disrupt the light impinging thereon. The contacting faces, including face 10F of part 10, though planar, are actually composed of minute hills and dales or cavities. Thus when the surface of glass, silica or other smooth material is observed under a high power microscope, it appears to be coarse or pitted, not smooth.

As a consequence, though the planar faces of parts 10 and 11 are in contact with each other, the interfacial region R is composed of a myriad of minute voids or pits. When, therefore, the laser beam is focused on region R to impinge on reflective layer 12, a large portion of the reflected light is not directed back through the transparent part 10. Instead, the light is reflected within the interfacial region in a manner similar to the multiple internal reflections produced in a fiber optics line because of the difference in the refractive index of the open spaces within the region and the glass bordering the region.

Hence the internally reflected energy is entrapped within interfacial region R. This trapped energy functions to heat and melt the surfaces of parts 10 and 11 to cause them superficially to fuse together. In doing so, the planarity of the parts is maintained. The heat also functions to vaporize the metallic layer on part 11 so that virtually no metal is incorporated in the welded joint. Thus two parts welded together in this fashion were cut to expose the joint and studied under an electron microscope. This examination revealed that the two parts were fully integrated without any trace of the metal reflective material.

In practice, similar results are obtainable without a reflective metal layer by so coarsening the face of part 11 so that it acts to randomly scatter the laser beam light impinging thereon. The scattered light undergoes multiple reflections in interfacial region R to generate the required welding heat.

Diaphragm Welding

Figure 3:
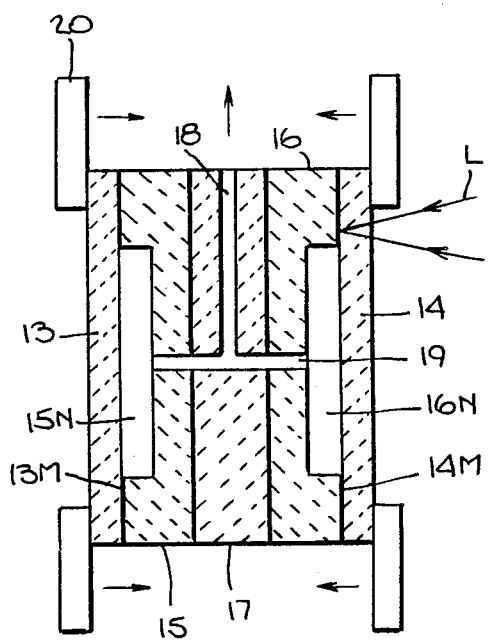
FIG. 3 is a sectional view of a differential pressure transducer whose diaphragms are welded to the body by a technique in accordance with the invention

Referring now to FIG. 3, there is shown a differential pressure transducer having a pair of diaphragms 13 and 14 which cover the respective nests formed in a pair of outer body sections 15 and 16 each having a circular cavity to define nests 15N and 16N surrounded by annular ridges having flat faces. Outer body sections 15 and 16 are disposed on opposite sides of an inner body section 17 provided with a longitudinal channel 18 that communicates with a transverse duct 19 leading into nests 15N and 16N.

The differential-pressure transducer is held under compression by a vise 20 which engages diaphragms 13 and 14 at their margins. The interior of the transducer is evacuated through channel 18 so that when welding takes place, there is virtually no gas within the transducer. Otherwise, the gas, when welding heat is applied, will expand, and in doing so separate the parts.

The planar circular margins 13M and 14M on the inner faces of the diaphragm are pressed against the annular planar ridges of the outer body sections 15 and 16 surrounding nests 15N and 16N to form an interfacial region R onto which laser beam L is focused.

Diaphragms 13 and 14 are formed of glass or other light permeable material, and the faces of the annular ridges of the outer sections 15 and 16 are metal plated or roughened to impart light disruptive properties thereto, as previously described. Hence the entrapped heat generated as a result of multiple internal reflections serves to weld the diaphragms to the ridges of the outer sections.

By making the outer sections 15 and 16 of the transducer body of transparent material such as glass or quartz, one can, using the same laser welding technique, weld these sections to inner section 17. The same laser welding technique can be used for pressure cells having a single diaphragm.

Vacuum Chamber

Figure 4:
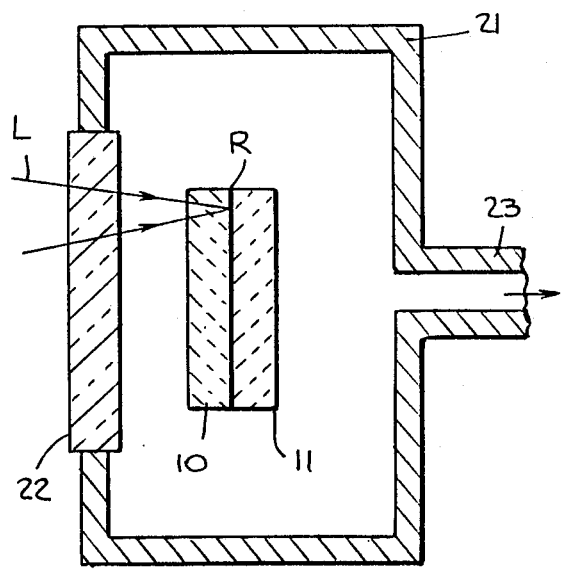
FIG. 4 illustrates schematically a vacuum chamber for carrying out laser beam welding.

In many cases one is able to effect good quality laser beam welding under atmospheric conditions. However, in some instances, it is desirable to carry out welding in vacuo to avoid gas expansion as a result of the welding heat, and for this purpose use is made of a vacuum chamber 21, as shown in FIG. 4.

Chamber 21 is provided with a transparent porthole 22 of glass or similar material through which a laser beam L is directed. This beam is focused on the interfacial region R between the contacting faces of parts 11 and 12 to be welded, part 11 being transparent.

Chamber 21 is evacuated through a pipe 23 attached to the wall of the chamber opposite porthole 22. The degree of vacuum must be such as to leave little residual gas in the chamber to avoid the adverse effects of gas expansion. In practice, the parts in the chamber are held together by a suitable vise.

Other Applications

In the case of watches, where the watch must be watertight, it is customary to place a gasket between the watch crystal and the watch case. But this has practical disadvantages, particularly if the pressure applied to the gasket is insufficient, or the gasket ages and deteriorates.

Figure 5:
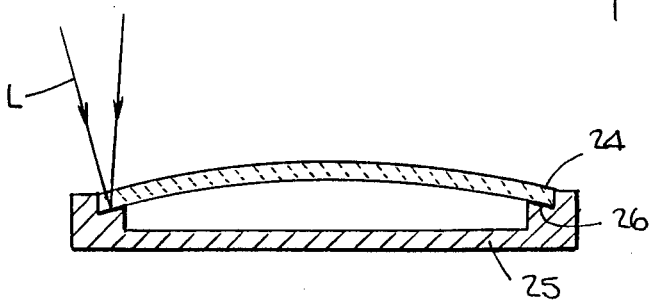
FIG. 5 shows the welding technique applied to a watch crystal which is to be joined to a watch case.

To provide a watertight weld, in the arrangement shown in FIG. 5 the watch crystal 24 is seated in an annular groove 26 formed on the cylindrical shell of a watch case 25 and is welded to this ridge by a laser beam L in the manner previously described. In this instance, there is no need to provide a metallic plating to reflect the light, for the watch case itself is metal.

While there have been shown and described preferred embodiments of a laser welding technique in accordance with the present invention, it will be appreciated that many changes and modifications may be made therein without, however, departing from the essential spirit thereof.

We claim:

1. A laser welding technique for welding together without using brazing material two parts having complementary faces, one of the parts being transparent to a laser beam and having a face composed of minute cavities, the face of the other part having light disruptive characteristics, said technique comprising the steps of:

(a) bringing the complementary faces of the parts together to create an interfacial region therebetween; and
   (b) projecting a laser beam through the transparent part in a direction substantially normal to the face thereof which complements the face of the other part and focusing the beam onto the interfacial region, the focused beam being intercepted by the light disruptive face of the other part and being scattered thereby into the cavities in the face of the transparent part to produce multiple internal reflections therein generating sufficient heat which is entrapped in the region to cause the parts at their complementary faces to superficially melt and fuse.

2. A technique as set forth in claim 1, wherein said one part is made of glass.

3. A technique as set forth in claim 1, wherein said other part is made of ceramic.

4. A technique as set forth in claim 1, wherein said disruptive characteristics are imparted to said other part by plating its face with a thin metal coating.

5. A technique as set forth in claim 1, wherein said disruptive characteristics are imparted to said other part by coarsening its face.

6. A technique as set forth in claim 1, wherein said beam is produced by a solid-state laser beam generator.

7. A technique as set forth in claim 1, wherein said one part is a circular glass diaphragm and said other part is a body section of a pressure transducer having a circular nest and an annular ridge surrounding the nest to provide a face which complements a face formed in the circular margin of the diaphragm.

8. A technique as set forth in claim 1, wherein said parts are welded together in a vacuum chamber to avoid gas expansion a a result of heating.

9. A technique as set forth in claim 1, wherein said parts being welded are held under compression in a vise.

* * * * *